W. C. STOLLBERG.
COMPOUND INSTRUMENT.
APPLICATION FILED DEC. 30, 1909.
963,405.
Patented July 5, 1910.
3 SHEETS—SHEET 1.
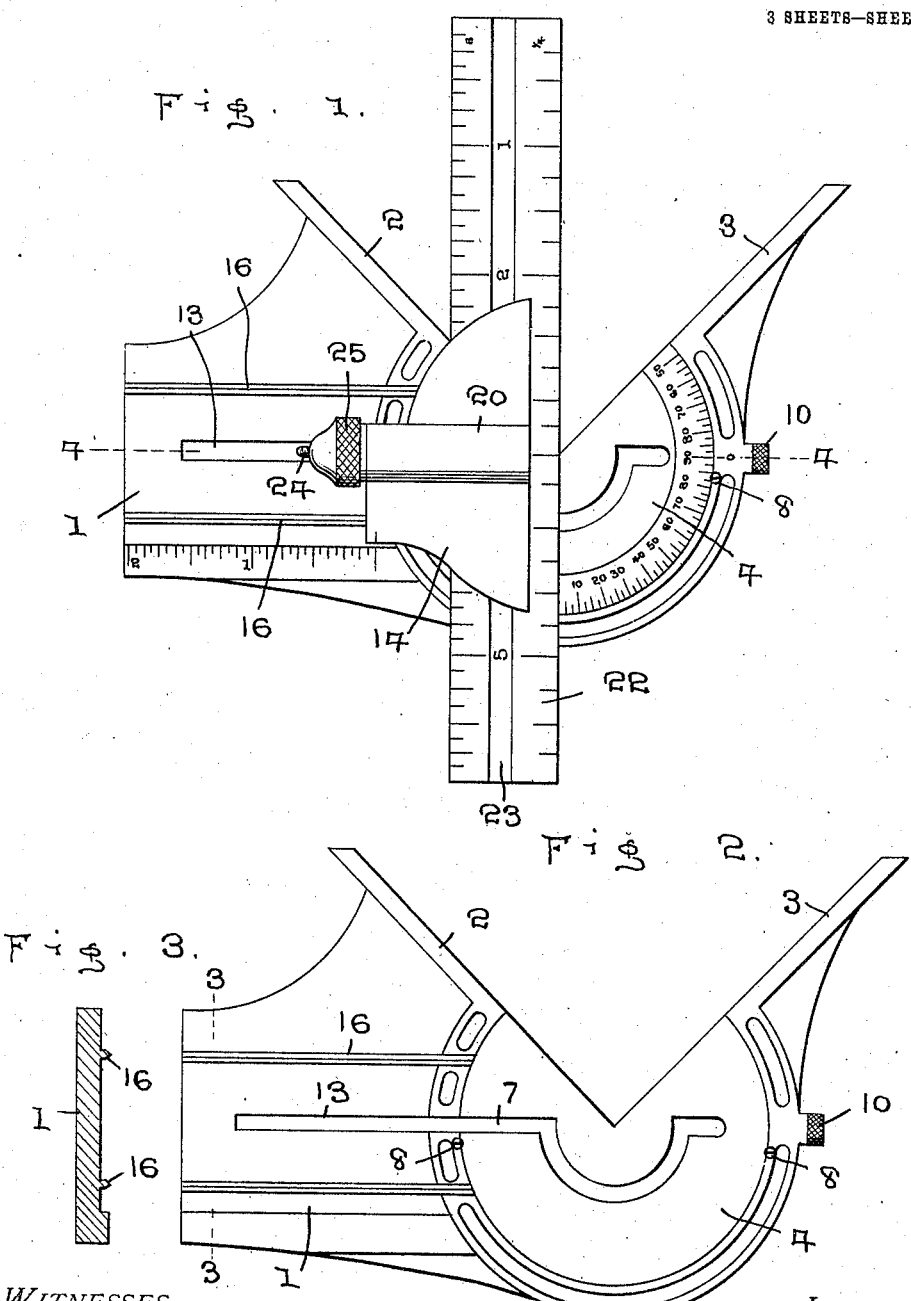

W. C. STOLLBERG.
COMPOUND INSTRUMENT.
APPLICATION FILED DEC. 30, 1909.
963,405.
Patented July 5, 1910.
3 SHEETS—SHEET 2.
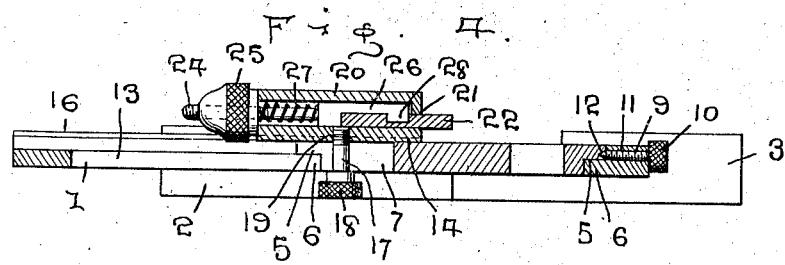
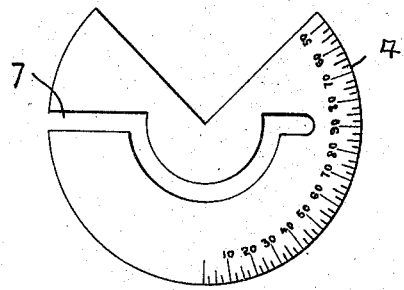
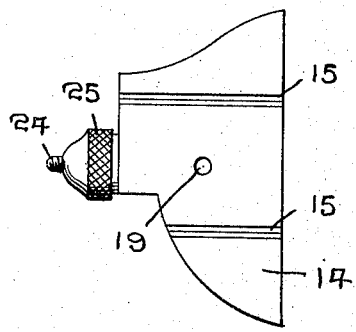
WITNESSES:
INVENTOR
W. C. Stollberg
BY
W. J. FitzGerald & Co.
Attorneys

W. C. STOLLBERG.
COMPOUND INSTRUMENT.
APPLICATION FILED DEC. 30, 1909.

963,405.

Patented July 5, 1910.
3 SHEETS—SHEET 3.

WITNESSES:

INVENTOR
W. C. Stollberg

UNITED STATES PATENT OFFICE.

WALTER C. STOLLBERG, OF QUINCY, ILLINOIS.

COMPOUND INSTRUMENT.

963,405.  Specification of Letters Patent.  Patented July 5, 1910.

Application filed December 30, 1909. Serial No. 535,559.

*To all whom it may concern:*

Be it known that I, WALTER C. STOLLBERG, a citizen of the United States, residing at 716½ Main street, Quincy, in the county of Adams and State of Illinois, have invented certain new and useful Improvements in Compound Instruments; and I do hereby declare the following to be a full, clear, and exact description of the invention, such as will enable others skilled in the art to which it appertains to make and use the same.

My invention relates to new and useful improvements in compound instruments, more particularly to the class of tools of compact form including interchangeable parts adapted for adjustment with the fixed parts of the tools to provide for a number of uses and my object is to provide an instrument that can be successively used as a carpenter's square, a bevel, a center square and an instrument for drawing chords.

A further object is to provide an instrument that is simple in construction, accurate in operation and inexpensive to manufacture.

These and other objects will be hereinafter referred to and more particularly pointed out in the specification and claims.

Figure 7:
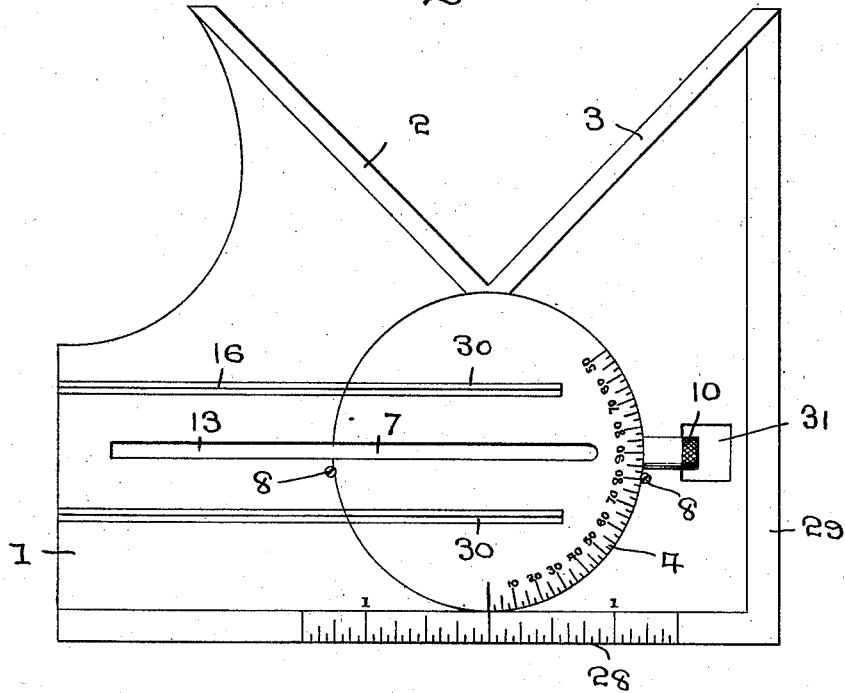
Figure 8:
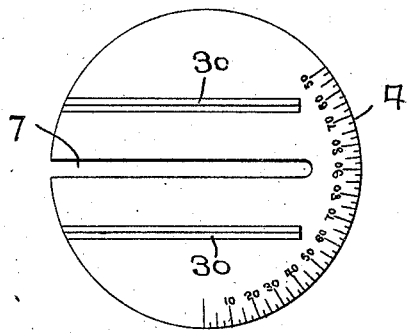

Referring to the drawings forming a part of this application, Figure 1 is a top plan view of the complete device ready for use. Fig. 2 is a top plan view of the instrument with the slide or carrier removed. Fig. 3 is a transverse section through the line 3—3, Fig. 2. Fig. 4 is a longitudinal section through the line 4—4, Fig. 1. Fig. 5 is a top plan view of the graduated disk showing the slot therein, and, Fig. 6 is a bottom plan view of the slide or carrier showing the grooves therein. Fig. 7 is a top plan view of the instrument with the carrier or slide removed, showing a slight modification. Fig. 8 is a top plan view of the modified form of graduated disk.

Referring to the drawings in which similar reference characters designate corresponding parts throughout the several views, 1 represents the base or stock of the instrument, one end of which is substantially circular in shape and having the radial arms 2 and 3 extending therefrom and inclosing an angle of ninety degrees, said arms being at an angle of forty-five degrees from the axial center of said base and the vertex of said inclosing angle being the center of the substantially circular portion at one end of said base. A substantially circular shaped disk 4 having the shoulders 5 on its under face is adapted to rest on the flanged portions 6 of the substantially circular end of said base, said disk having a segment cut therefrom to conform in outline to the inclosing angle and also having a slot 7 therein, part of which is disposed arcuately, said arcuate portion concentric with the disk. To keep the top of said disk flushed with the top of the base, the screws 8 are inserted in the base, the heads of which contact with the face of the disk, while the revolving of said disk is obviated by means of an adjusting screw 9, with the usual milled head 10, inserted in a threaded opening 11 at one end of the base and adapted to engage a V-shaped aperture 12 in the periphery of the disk and when said disk is held in this retained position, the longitudinal extension of the slot 7 therein alines itself with the slot 13 extending longitudinally in the base. A slide or carrier 14 having grooves 15 on its under face is adapted to travel longitudinally on the tracks 16 of said base 1 and a retaining screw 17 with the usual milled head 18 is inserted through said slot 7, the threaded end engaging the threaded aperture 19 in the under side of said carrier, thereby retaining said carrier to the base and adapted to be tightened when it is desired to hold said carrier in any predetermined position.

The carrier 14 has an enlarged cylindrical portion 20 thereon and a transverse recess 21 adapted to receive a rule 22 having a groove 23 therein, said enlarged cylindrical portion 20 containing an adjusting screw 24 and milled nut 25, a clamp 26 on the inner end of said adjusting screw and a coiled spring 27 between said nut and clamp, said clamp having a head 28 thereon adapted to enter the groove 23, whereby said rule is held in its retained position or adjusted slightly longitudinally. It will be seen that the coiled spring 27 on the adjusting screw between the clamp 26 and the nut 25 is adapted to retain said nut in its fixed position throughout the operation of the device.

As shown in Figs. 7 and 8, I have made slight modifications in the general form of the device, first enlarging the stock or base and forming a straight edge 28 on the longitudinal side edge thereof at right angles to the edge 29, whereby said edges 28 and 29 may be used as a square. I have also shown the arms 2 and 3 of the stock 1 inclosing an angle, the vertex of which is at a point beyond the periphery of the disk 4, thereby avoiding the necessity of cutting a segment therefrom to conform to the outline of said inclosing angle, as in the other form. In this form of disk, I have shown simply a straight elongated slot 7 adapted to aline itself with the slot 13 of the stock and I have also shown tracks 30 on said disk adapted to be in alinement with the tracks of said stock when the slots are alined, thereby allowing the slide or carrier to pass beyond the bisectrix of the inclosing angle. An opening 31 has also been provided adjacent the edge 29 for readily operating the head 10 of the adjusting screw retaining the disk 4 in position.

In operating the device for use as an ordinary carpenter's square, the disk 4 is first tightened by means of the adjusting screw 9, the carrier 14 with the rule 22 slid along to a point somewhat distant from the arms 2 and 3 and the retaining screw 17 tightened leaving said arms unobstructed and adapted for their particular use.

When it is desired to use this device as a bevel, the carrier retaining the rule is slid along until the retaining screw positions itself within the slot of the disk whereupon the carrier can be moved until said retaining screw is positioned within the arcuate portion of the slot, the edge of the rule registering with the graduations on the disk and coöperating with either arm 2 or 3 to form the predetermined angle, or said disk may be released from its retained position through the medium of adjusting screw 9 and the carrier revolved with the disk until the desired angle is formed between either arm and the rule at which point the retaining screw is tightened, thereby holding the carrier in a retained position and the predetermined angle formed.

In using the device in connection with round work, that is, as a center square and instrument for drawing chords, the object, taking for convenience a cylinder, is placed within the inclosing angle, the arms 2 and 3 acting as tangents to the sides of said cylinder. The carrier is then moved along its tracks until the edge of the rule coincides with the vertex of the arms and the line drawn on the end of said cylinder along the edge of said rule will be the diameter thereof, said tracks and slot being at right angles to the bisectrix of said inclosing angle. When it is desired to draw chords parallel to the diameter heretofore drawn, all that is necessary is to hold the stock or base in the same position and move the carrier holding the rule along its tracks and at the desired point draw another line on the end of the cylinder which will naturally be parallel to the diameter and should it be desired to draw chords or diameters at different angles, the base may be moved around to any position or the carrier moved in line with the arcuate slot of the disk whereupon the desired line may be obtained.

Applicant has also shown along one edge of the stock or base graduations which are adapted to register with one edge of the rule in its many uses.

It will be seen that applicant has shown a device that may be used as a carpenter's square, with the slight adjustment of its movable parts with relation to its fixed parts be used as a bevel and with the same adjustment may be successively used as a center gage and an instrument for drawing chords. It will further be seen that in using this device in all its operations, it is perfectly accurate and it will still further be seen that its simplicity of construction makes it extremely valuable as well as inexpensive to manufacture.

What I claim is:—

1. A device of the character described, comprising a base having arms extending from one end thereof, said base having tracks thereon and a slot, a disk, means to retain said disk on said base, a recessed carrier adapted to travel on said tracks, a rule and means to retain said rule in said carrier.

2. A device of the character described, comprising a base having arms extending from one end thereof, said base having tracks and a slot therein, a disk having a slot disposed arcuately in part, means to retain said disk on said base, a carrier grooved on its bottom and adapted to travel on said tracks, means to retain said carrier to said base, a rule and means on said carrier for retaining said rule.

3. In a device of the character described, the combination with a base having a substantially circular portion at one end thereof and arms extending therefrom, said base having tracks thereon and a slot, a disk fitting in said circular portion and having a slot disposed arcuately in part, said slot adapted for alinement with the slot of said base, and means to retain said disk within said base; of a carrier grooved on its under portion and having a transverse recess therein, said carrier adapted to travel on said tracks, a grooved rule carried by the recess in said carrier, clamping means carried by said carrier for retaining the rule in position and additional means for retaining the carrier to the base.

In testimony whereof I have signed my name to this specification in the presence of two subscribing witnesses.

WALTER C. STOLLBERG.

Witnesses:
ARTHUR KAEMPEN,
J. JEROME WELLMAN.